(12) United States Patent
Iyengar et al.

(10) Patent No.: US 7,783,602 B2
(45) Date of Patent: *Aug. 24, 2010

(54) SYSTEM AND METHOD FOR ACHIEVING DEFERRED INVALIDATION CONSISTENCY

(75) Inventors: Arun Kwangil Iyengar, Yorktown Heights, NY (US); Richard P. King, Scarsdale, NY (US); Daniela Rosu, Ossining, NY (US); Karen Witting, Croton-on-Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 174 days.

This patent is subject to a terminal disclaimer.

(21) Appl. No.: 11/867,067

(22) Filed: Oct. 4, 2007

(65) Prior Publication Data

US 2008/0034165 A1 Feb. 7, 2008

Related U.S. Application Data

(63) Continuation of application No. 10/715,260, filed on Nov. 17, 2003, now Pat. No. 7,318,074.

(51) Int. Cl.
*G06F 7/00* (2006.01)
(52) U.S. Cl. ................... 707/638; 707/649; 707/654; 707/662; 707/666; 707/668
(58) Field of Classification Search .............. 707/1, 707/10, 203, 638, 649, 654, 662, 666, 668; 716/6; 711/118, 133; 709/246, 203, 247
See application file for complete search history.

(56) References Cited

U.S. PATENT DOCUMENTS

| | | | | |
|---|---|---|---|---|
| 5,528,511 | A * | 6/1996 | Hasegawa | 716/6 |
| 6,836,827 | B2 * | 12/2004 | Karlsson et al. | 711/133 |
| 7,130,964 | B2 * | 10/2006 | Ims et al. | 711/118 |
| 7,457,822 | B1 * | 11/2008 | Barrall et al. | 1/1 |
| 2002/0010798 | A1 * | 1/2002 | Ben-Shaul et al. | 709/247 |
| 2002/0194382 | A1 * | 12/2002 | Kausik et al. | 709/246 |
| 2003/0115186 | A1 * | 6/2003 | Wilkinson et al. | 707/3 |
| 2003/0200194 | A1 * | 10/2003 | Arnold et al. | 707/1 |
| 2004/0034744 | A1 * | 2/2004 | Karlsson et al. | 711/133 |
| 2004/0128346 | A1 * | 7/2004 | Melamed et al. | 709/203 |
| 2004/0230747 | A1 * | 11/2004 | Ims et al. | 711/133 |
| 2008/0040385 | A1 * | 2/2008 | Barrall et al. | 707/103 Y |

OTHER PUBLICATIONS

Magnus Bjornsson et al., "Buddy Cache: High performance object storage for collaborative strong-consistency applications in a WAN", ACM, Nov. 2002, pp. 26-39.*

(Continued)

*Primary Examiner*—Thuy N Pardo
(74) *Attorney, Agent, or Firm*—Tutunjian & Bitetto, P.C.; Preston J. Young, Esq.

(57) ABSTRACT

In a system having a plurality of caches, a method for maintaining cached objects includes storing an object in a plurality of caches. In response to a request to update the object, a future invalidation time is determined when the object should be invalidated in caches currently storing the object. Updating of the object is delayed until the invalidation time has passed.

20 Claims, 8 Drawing Sheets

OTHER PUBLICATIONS

J.K. Ousterhout, A. R. Cherenson, F. Douglis, M. N. Nelson and B. B. Welch; The Sprite Network Operating System; IEEE; 1988, pp. 23-36; University of California at Berkeley.

J.H. Howard, M. L. Kazar, S. G. Menees, D. A. Nichols, M. Satyanarayanan, R. N. Siebotham and M. J. West; Scale and Performance in a Distributed File System; ACM Transaction on Computer Systems, vol. 6, No. 1, Feb. 1988, pp. 51-81.

J. Challenger, A. Iyengar and P. Dantzig; A Scalable System for Consistently Caching Dynamic Web Data; IEEE; 1999; 10 pages; IBM Research; T.J. Watson Research Center, Yorktown Heights, NY.

* cited by examiner

SYSTEM AND METHOD FOR ACHIEVING DEFERRED INVALIDATION CONSISTENCY

CROSS-REFERENCE TO RELATED APPLICATIONS

This application is a continuation of U.S. patent Ser. No. 10/715,260, filed Nov. 17, 2003 now U.S. Pat. No. 7,318,074, which is incorporated by reference herein in its entirety.

BACKGROUND OF THE INVENTION

1. Field of the Invention

The present invention relates to data storage and more particularly to systems and methods for achieving data consistency among multiple copies.

2. Description of the Related Art

Many computer applications create multiple copies of the same data. Maintaining consistency of these multiple copies is important. The method employed, for updating the multiple copies of a piece of data, determines the level of consistency among the copies, such as strong or weak consistency, the resource consumption in various components of the system, such as network bandwidth and CPU cycles, and the performance implications as observed by end users, such as service delays.

One problem of keeping multiple caches strongly consistent with each other appears in processor caches for multiprocessors and file caches for distributed file systems. For processor caches, response times must be extremely fast (orders of magnitude faster than those for Web caches); to achieve those speeds, the caches have extremely short and fast links of guaranteed reliability to a memory controller that permits them to be informed simultaneously of updates.

Techniques that work well given these facilities are simply not practical for distributed applications such as Web caches. For example, in the Sprite distributed operating system (Ousterhout, J. K., Cherenson, A. R., Douglis, F., Nelson, M. N, and Welch, B. B., "The Sprite network operating system", Computer 21(2), pp. 23-36, February 1988), the system enforces strong consistency for shared files. Namely, when one of the nodes opens a file for write, all of the cached copies of the file are invalidated, and all read and write operations on the file go to the server storing the file. This method is characterized by high access latencies for objects with high likelihood of concurrent read and write accesses.

A typical method for enforcing strong consistency is postponing the publication of a new object version until all nodes receive, enact, and acknowledge an invalidation request or they are declared failed. Therefore, requests that are received by a node after it has invalidated the cached object have to wait until the system decides that the new version can be published. Thus, response times of user requests can be unpredictably affected by failures of nodes in the system never involved in serving the particular requests.

In the area of distributed databases, the ZEMBU™ Distributed Application Platform takes a similar approach as it provides transactional control over how, what, and when updates are made available from a single, centralized production system to remote servers.

Therefore, a need exists for a strong consistency scheme, which ensures that read requests at well-functioning nodes are not delayed due to node failures in the system.

SUMMARY OF THE INVENTION

In a system having a plurality of caches, a method for maintaining cached objects includes storing an object in a plurality of caches. In response to a request to update the object, a future invalidation time is determined when the object will be invalidated in caches currently storing the object. Updating of the object is delayed until the invalidation time has passed.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
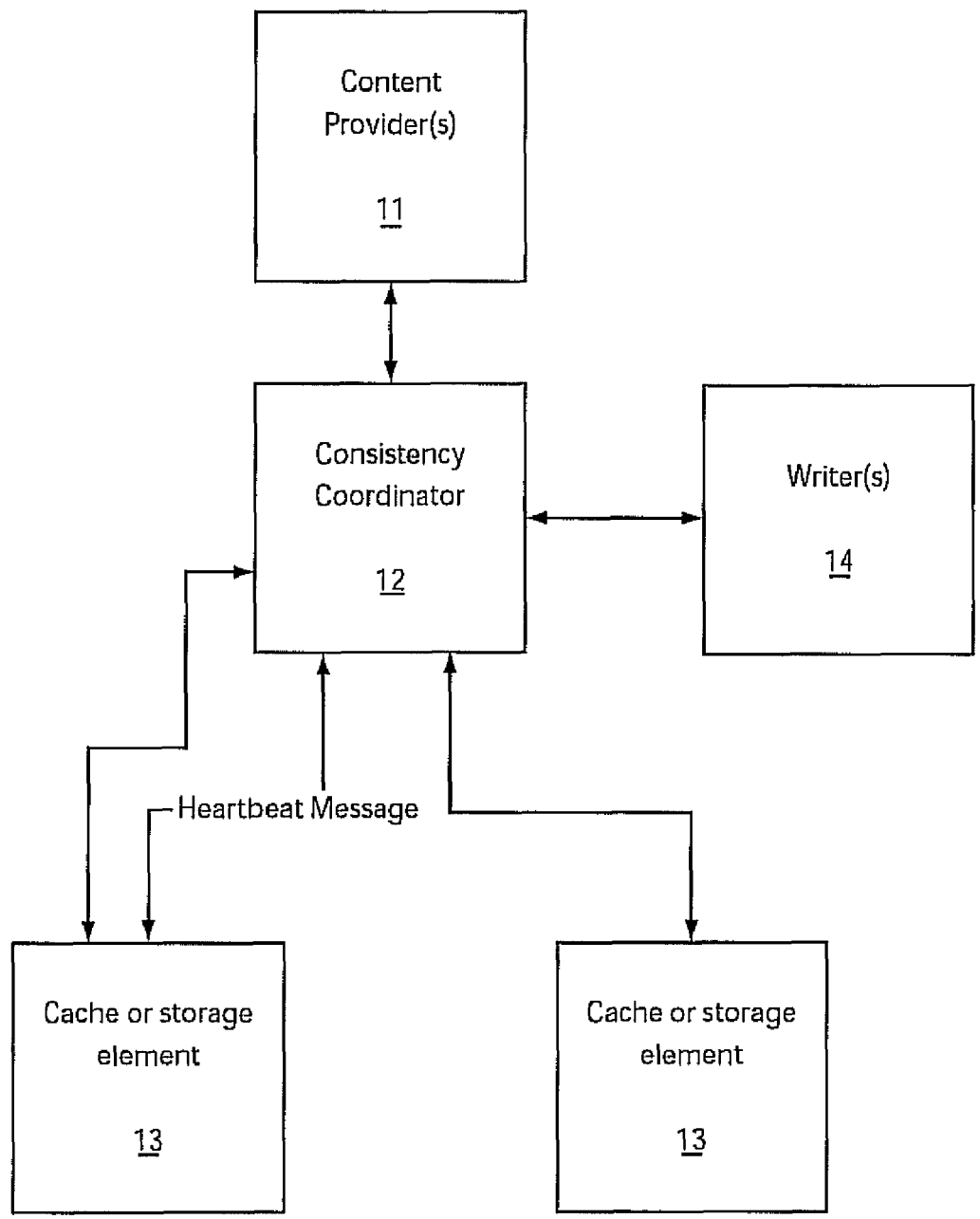
FIG. 1 is a block/flow diagram of a system showing features of the present invention.

The present invention provides systems and methods for achieving high levels of consistency among multiple copies of data across nodes of a distributed system. The present invention is particularly useful in systems where nodes are prone to network or node failures with minimal delay for read accesses. Achieving strong consistency among the distributed copies of an object provides that, at any point in time, two requests for the object received at any of the nodes in the system return the same content.

The present invention ensures high levels of consistency while preventing input/output requests from being delayed due to network or system failures in remote segments of the distributed system. Namely, when a new copy of an object is to be updated, the nodes caching the object are informed that the object is to be modified. All of the cached copies of the object are invalidated at a specified moment in the future. The moment of invalidation is chosen such that each node has either received the update notification or has declared itself failed (e.g., unable to service any subsequent requests). Read requests received prior to this moment are served with the previous version of the object. After the invalidation moment, the old versions are invalidated.

With this method, strong consistency can be enforced when all caches and a consistency coordinator have synchronized clocks. Several applications can make use the present invention including but not limited to caches, Web applications, file systems, and databases. For instance, Web applications can use embodiments of the present invention for publishing content such as stock quotes to a population of traders. The method ensures that all traders see the same information at any point in time and their response times are not affected by failures of remote nodes in the system.

Cache Consistency Methods

When multiple copies of an object exist within a system, cache consistency methods solve the problem of how to ensure that upon object updates, clients reading the various copies obtain "consistent" content. The semantics of "consistent" depends on, e.g., system requirements. At one end, the system can provide strong consistency, ensuring that at any time, a request to read an object is satisfied with the latest version of the object. At the other end, the system can provide weak consistency, ensuring that a read returns a value for the object, which was current at some point in the past.

Strong consistency may need a tight coordination of updates of copies of an object. In a system of peer caches, one has to ensure that at the time when a new version of an object becomes available, no peer cache can serve an earlier version. Therefore, all the cached copies of an object should be invalidated before an update takes place in any of the caches.

Weak consistency does not require the coordination of updates; individual caches can acquire and serve the latest version of an object even if peer caches have not invalidated their old versions. Therefore, weak consistency methods do not guarantee that all caches storing a copy of the object will receive messages and process them at exactly the same time. Namely, during an object update, in the time interval between the first and the last cache receiving their invalidation messages, a client that requests for the updated object, which reaches different caches, can receive different versions of the object. The likelihood of this inconsistency increases when there is a wider variance in communication times between the individual caches and the content provider/coordinator.

Weak consistency methods can differ in how long a time it takes and how many system resources are consumed for updating all object copies with the latest version. In comparison to weak consistency methods, strong consistency methods are likely to need more message exchanges and may result in a longer time interval in which the object is not accessible. The difference becomes relevant when the distance between content provider and peer caches increases.

Several applications can make use of the present data consistency methods including but not limited to storage elements, which may include caches, Web applications, file systems, memory storage devices and databases.

The present invention will be illustratively described in terms of a cache consistency system and method; however, while the present invention is described in the context of caches, it should be clear to one of ordinary skill in the art that these techniques can be applied to application states for a broad range of applications in addition to caches. It is also to be understood that objects as referred to herein may include any form of data, data sets, data blocks, and/or objects used in object-oriented programming.

It should be understood that the elements shown in FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, a system 10 having a plurality of caches 13 storing data from one or more content providers 11 is illustratively shown. In one scenario, one or more writers perform updates to cached data. It is possible for a writer 14 and a cache 13 to reside on the same node or to constitute the same entity. Similarly, it is possible for a writer 14 and a content provider 11 to reside on the same node or to constitute the same entity.

The consistency coordinator 12 coordinates interactions among content providers 11, writers 14, and caches 13. Consistency coordinator 12 may be distributed across multiple nodes and/or multiple consistency coordinators 12 may exist in the system. The use of multiple consistency coordinators can result in higher availability, as the system may be able to function in the event of a failure of less than all of the consistency coordinators. Multiple consistency coordinators can also increase the throughput of the system and thus improve performance.

Although content provider 11, writer 14, caches 13, are depicted in FIG. 1 with communication paths to consistency coordinator 12, it is possible to have other communication paths in the system within the spirit and scope of the invention. As one such example, a writer 14 may communicate with a content provider 11 directly. Communication may also be achieved by employing heartbeat messages 27 as will be explained below.

In some cases, consistency coordinator may not have exact information about which caches are storing which objects. In these situations, it can still use the information it has to make intelligent choices.

Deferred-invalidation Consistency Method

The present invention provides a deferred-invalidation consistency method. This policy addresses the problem of multiple cache updates and provides strong consistency in the case when the clocks of all nodes in the system are perfectly synchronized.

The present invention provides that cache nodes are instructed to discard an old version of an object at a time in the future, called an invalidation time, when each cache is likely to have either learned about the update or has declared itself disconnected. The invalidation time is determined based on the available infrastructure mechanisms and configuration parameters. The deferred cache invalidation method can be used in a system with distributed cache coordination, which is a system in which caches interact directly, without the mediation of a consistency coordinator. Also, the method can be used in a system with centralized cache coordination, implemented by a consistency coordinator. Furthermore, the method can be used in a system in which writers of an object, if more than one, coordinate through a locking mechanism.

When using the consistency coordinator, the protocol is defined by the following steps. When the content provider wishes to update an object, it contacts the consistency coordinator. The coordinator decides on a time when the deferred invalidation should be enacted by the caches based on the available infrastructure mechanisms and configuration parameters. Then, it sends to caches a deferred-invalidation message indicating the object and the time of invalidation. The coordinator can send this message to all caches or a subset of all caches, such as only to the caches holding the object. Upon receiving this message, a cache marks the object for invalidation at the indicated time (e.g., by setting the expiration time to the indicated time), and sends an acknowledgment to the coordinator.

Requests that are received by the cache between the receipt of the deferred-invalidation message and the invalidation time are replied with the old version of the object. The first request after the invalidation time is served the new version of the object. Caches that do not acknowledge the deferred-invalidation message by the time of the enactment are considered down by the coordinator. Caches that have not received the deferred-invalidation message are likely to have considered themselves down by the time of the invalidation time, and caches that have received the message but their acknowledgement does not reach the coordinator, are likely to be either down or enacting a correct invalidation at the invalidation time.

Deferred-invalidation consistency can be used for objects updated by one or more writers. For updates of a single-writer object, the writer can create a new version of the object and send an update notification message to the consistency coordinator, which uses the deferred invalidation method to coordinate the update at all nodes in the system. For multiple writers, before the update, the writer can contact the consistency coordinator to retrieve the most recent version of the object. The consistency coordinator sends the content, or acknowledges that the local copy in the writer cache is the most recent. Upon sending the reply, the coordinator records a write lock for the object held by the writer and assigns it a lock timeout.

Upon receiving the most recent version of the object, the writer performs the update and sends the new version to the consistency coordinator, which cancels the write lock, and distributes the new content to the other caches using the deferred invalidation consistency methods. To the writer cache, the coordinator sends an acknowledgement of update upon receiving all of the acknowledgements to the related invalidation requests. The writer is not using the new version of the object to reply to client requests until the object invalidation time is reached and it receives an acknowledgement from the coordinator. In the meantime, it can use the previous version of the object to reply to requests that only require a read of the updated object. If the writer receives an invalidation request before the acknowledgment, it discards both the old and the updated versions of the object.

If the consistency coordinator receives another request for update before the current write lock for the object expires, it postpones the reply until the update is received or the write lock expires. In the former case, the new version is sent to the requesting node and a new write lock is set for the object. In the latter case, the writer cache is sent a negative acknowledgment of update, and the requesting node is sent the version of the object available to the coordinator, and a new lock is set for the object. Upon receiving a negative acknowledgement, the cache invalidates the updated version, if already created, and it can reinitiate the update procedure.

If an update completes before the previous version was fully distributed to caches (according to the chosen protocol), the coordinator saves the new content and acts as indicated for update-local-copy if the second update completes before the distribution completes.

Read requests arrived at the coordinator for an object with a write lock are responded with the most recent version available on the coordinator.

Figure 3:
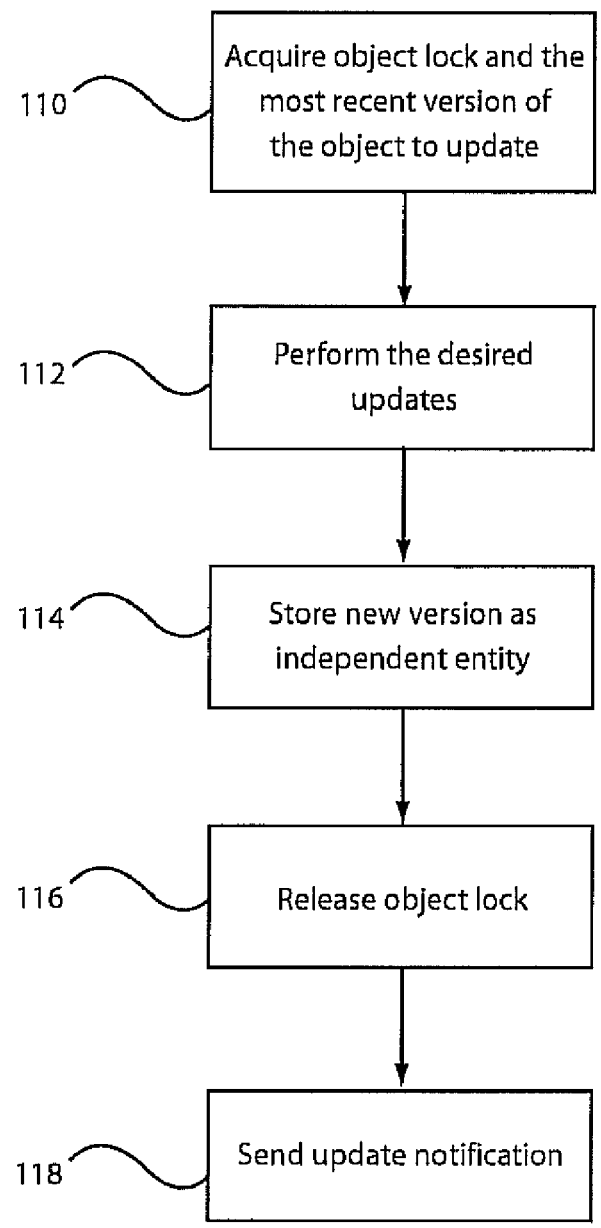
FIG. 3 is a block diagram showing an illustrative procedure performed by a writer node (multiple or unique writer nodes) in accordance with the present invention.

Referring now to FIG. 3, a write procedure used by an object writer, when there are multiple potential writers for the object to update, is illustratively depicted. Upon deciding to perform an update, a writer node acquires a write lock from the other potential writers of the object and the most recent version of the object in block 110. The acquired version may be different than the current version used by cache nodes to serve read requests. The procedure for lock acquisition depends on system characteristics. For example, when the system is configured with centralized cache coordination, the consistency coordinator can implement the lock management, as well. Therefore, the writer node sends a lock request to the consistency coordinator, which will respond to the request when there is no other writer holding the lock in the object.

After acquiring the lock and the most recent version of the object, the writer produces a new version in block 112 and stores the new version in its local repository while preserving the original version in block 114. The writer releases the lock in block 116 and sends a notification of update message in block 118. The content and the destination node(s) of the notification of update message depend on system characteristics. For example, the message can include only an object descriptor with parameters such as creation time, or the message can include both object descriptor and object content. In addition, the message can be sent to a consistency coordinator in a system with centralized cache coordination or the message can be sent to all of the cache nodes in a system with distributed cache coordination.

For a single or unique writer of an object the procedure of FIG. 3 may be employed however, blocks 110 and 116 are more easily eliminated since object locks are not needed to prevent other writers from altering the objects or data.

Figure 4:
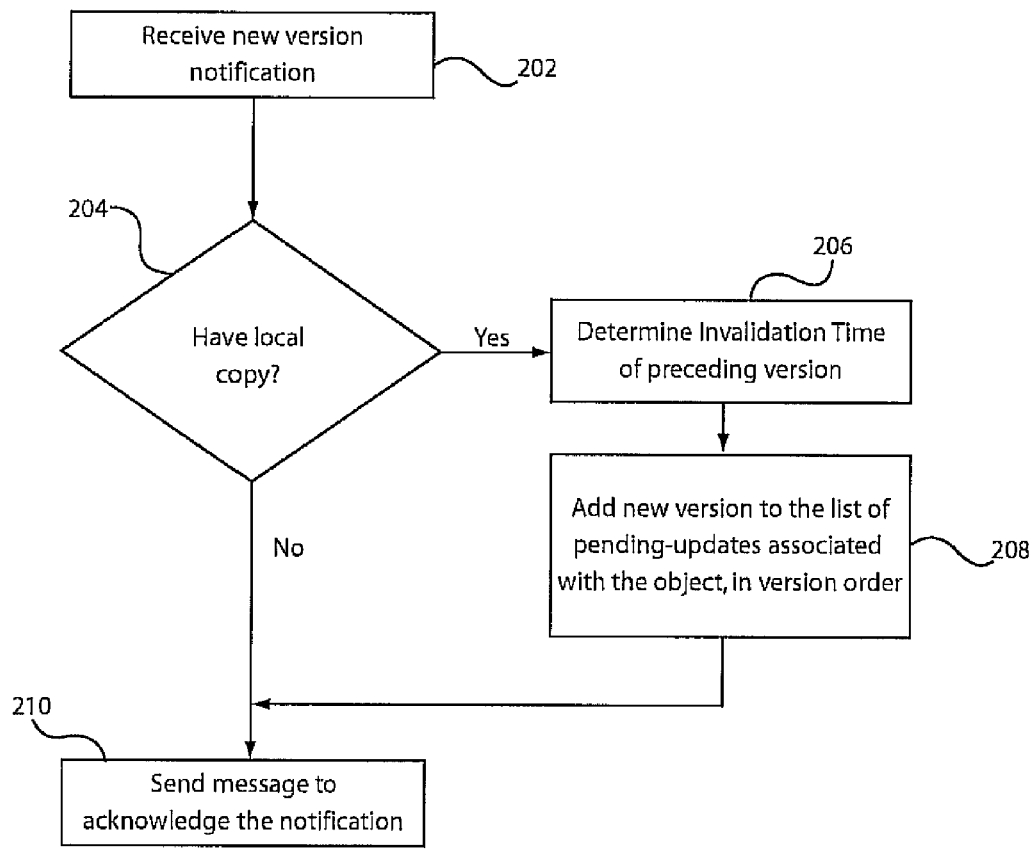
FIG. 4 is a block diagram showing an illustrative procedure performed by a cache node upon receiving an update notification in a system with distributed cache coordination (no consistency coordinator) in accordance with the present invention.

Referring to FIG. 4, protocol in a system with distributed cache coordination is illustratively shown. Upon receiving the notification message in block 202, a cache node performs the steps depicted in FIG. 4. If it has a local copy of the object in block 204, the cache node determines the invalidation time, in block 206, for the version of the object preceding the one specified in the notification message and adds a meta-data descriptor for the new version to the list of pending-updates associated with the object in block 208. The invalidation time may be defined in the notification message or the invalidation time may be determined by the cache node itself, based on information in the notification message and on configuration parameters. The invalidation time computed for an older version of an object should be earlier than the invalidation time of a most recent version of the same object. Optionally, the cache node sends an acknowledgement message to the sender of the notification message in block 210.

Figure 5:
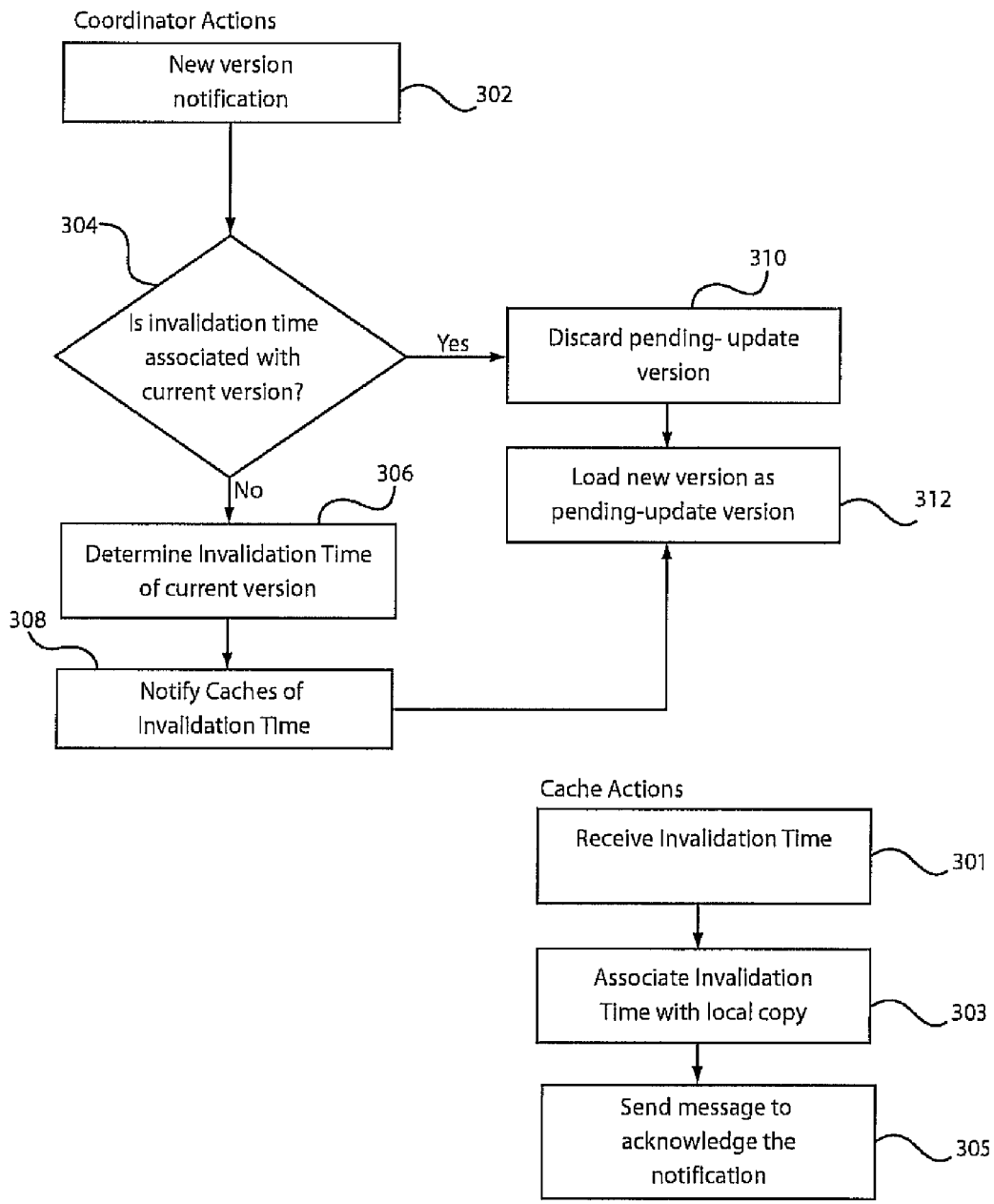
FIG. 5 is a block diagram showing an illustrative procedure for handling update notification in a system with centralized cache coordination (e.g., with consistency coordinator) or by a cache node (e.g., without a consistency coordinator) in accordance with the present invention.

Referring to FIG. 5, protocol in a system with a consistency coordinator may include the steps illustratively depicted in FIG. 5, which are performed by a consistency coordinator in response to receiving a notification of update (block 118). In block 302, when the coordinator receives a notification of object update from one of the nodes in the system, the coordinator checks the meta-data associated with the object in its local repository in block 304. If no invalidation time is associated with the object, the object has no "pending for release" version, e.g., version waiting for release. In this case, the coordinator determines the invalidation time of the current version in block 306. The coordinator sends a notification message, including the invalidation time, to all of the cache nodes, or alternatively, only to the cache nodes that have a copy of the object in block 308. Eventually, the coordinator records the new version as the "pending for release" version of the object in block 312.

If there is an invalidation time associated with the object, the coordinator replaces the current "pending for release" version in block 310, with the version it just received notification of update for in block 312.

Blocks 301, 303 and 305 are performed by a cache node upon receiving a notification message, in block 301, from the coordinator (block 308). The cache associates the invalidation time retrieved from the notification message with the meta-data of its local copy in block 303. For example, this may be achieved by setting the expiration time to the indicated time. Optionally, the cache node sends an acknowledgement message to the coordinator in block 305.

Figure 6:
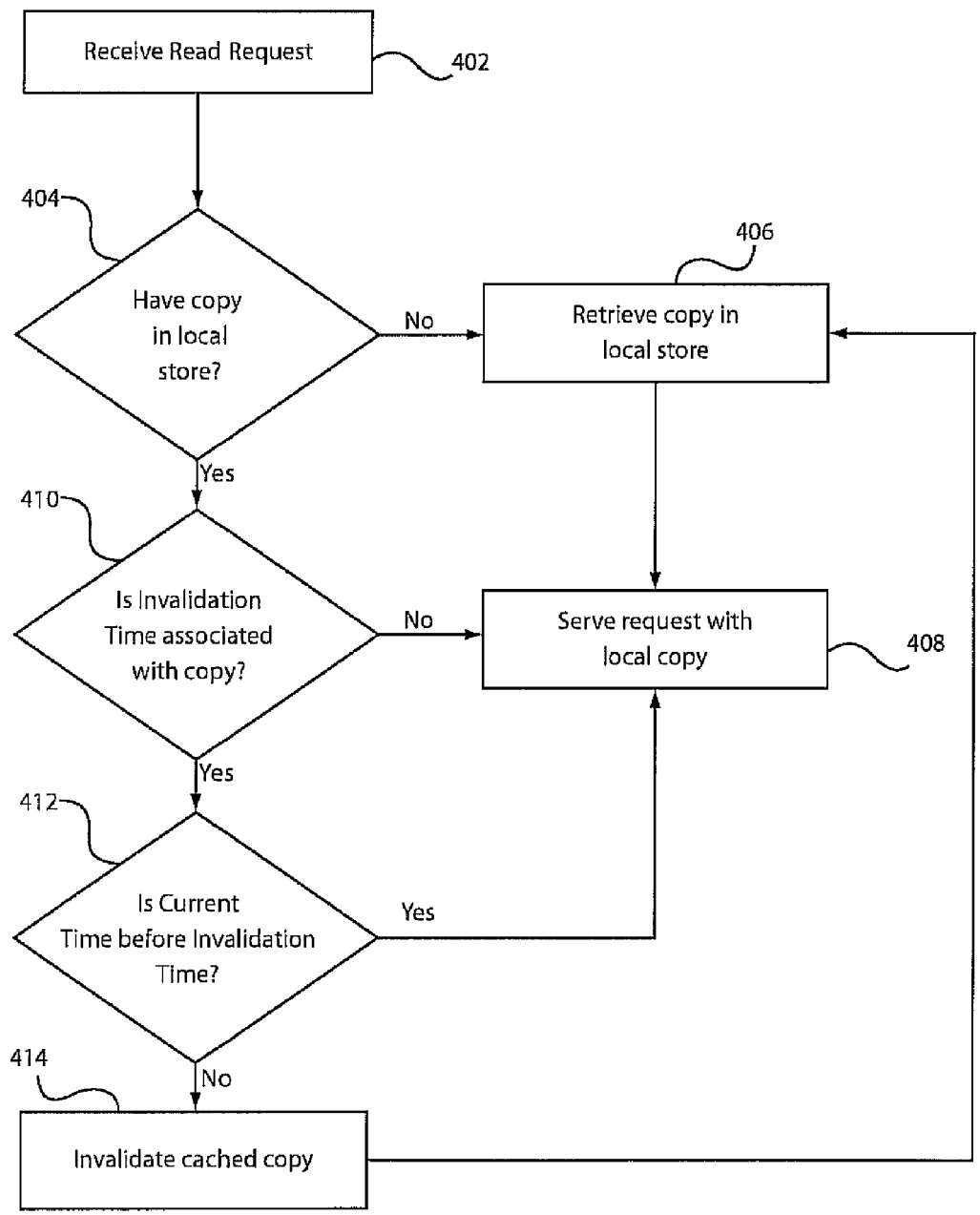
FIG. 6 is a block diagram showing an illustrative procedure for handling a read request at a cache node in accordance with the present invention.

Referring to FIG. 6, serving a read request at a cache node is illustratively depicted. Upon receiving a request in block 402, the cache node checks its local repository in block 404. If it does not have a local copy, it requests the object, in block 406, from the content provider for the object or from the consistency coordinator, depending on system configuration. If the cache has a local copy in block 404, and there is no invalidation time associated with the copy in block 410, the cache uses this content to service the read request in block 408.

If an invalidation time is associated with the local copy from block 410, the cache node compares this time with the current time in block 412. If the invalidation time is in the future, the cache uses the local copy to service the read request in block 408. If the invalidation time is in the past, the cache invalidates the local copy in block 414, removing the associated meta-data including the invalidation time, and requests the object, from the content provider for the object or from the consistency coordinator, depending on system configuration.

Figure 7:
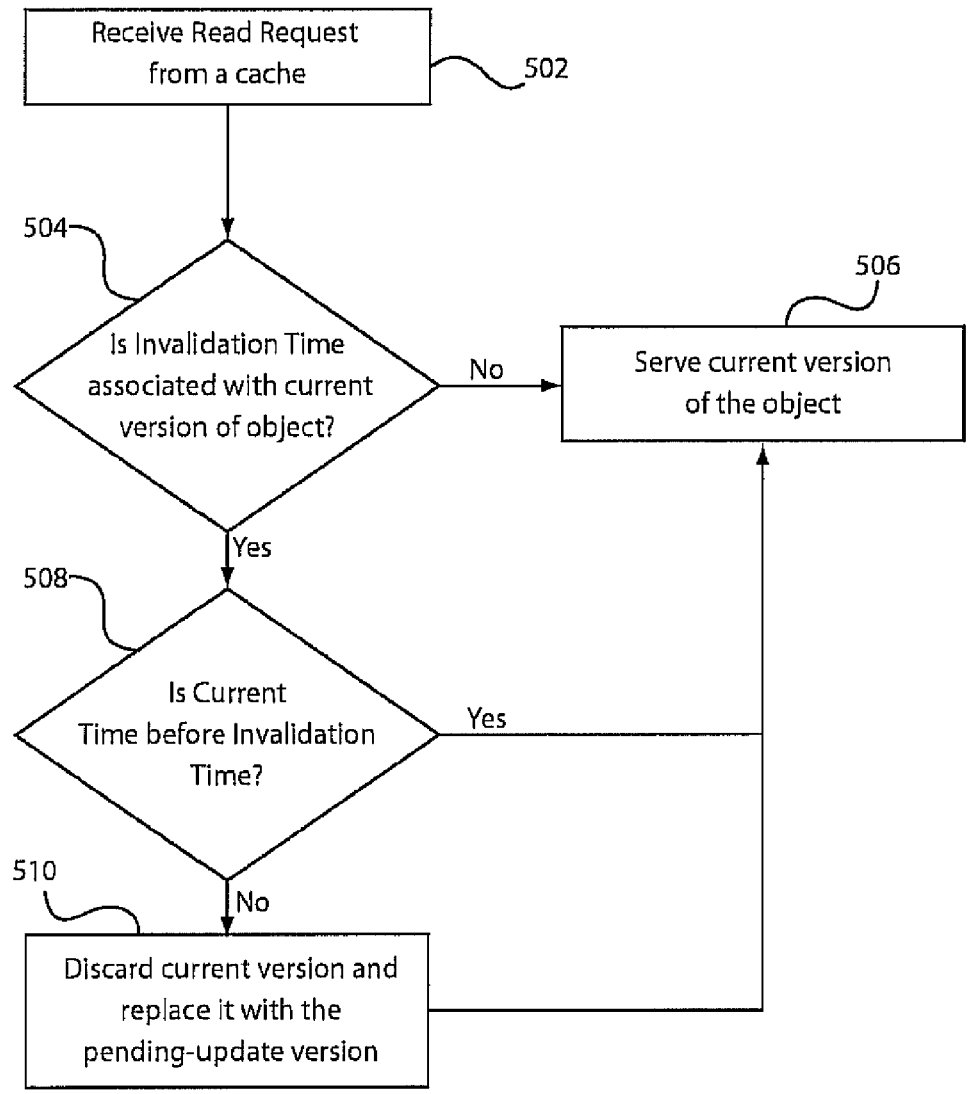
FIG. 7 is a block diagram showing an illustrative procedure for handling a read request at a consistency coordinator in accordance with the present invention.

Referring to FIG. 7, a method for a consistency coordinator serving a read request from a cache node is illustratively depicted. Upon receiving a request from a cache node in block 502, the consistency coordinator checks whether there is an invalidation time associated with the object in block 504. If there is no invalidation time, the coordinator serves the current request in block 506. This can be implemented by one of serving the content from its local storage, if available, and redirecting the cache node to the node that produced the most recent version of the object, and retrieving the content itself from this node and forwarding it to the requesting cache node.

From block 504, if there is an invalidation time associated with the current version of the object, and this time is in the future in block 508, the coordinator serves the current request as described above with reference to block 506.

From block 508, if the invalidation time associated with the current version of the object is in the past, the coordinator discards the current version of the object and moves the pending-update version as the current version of the object in block 510. Eventually, the coordinator serves the current request as described above in block 506.

Figure 8A:
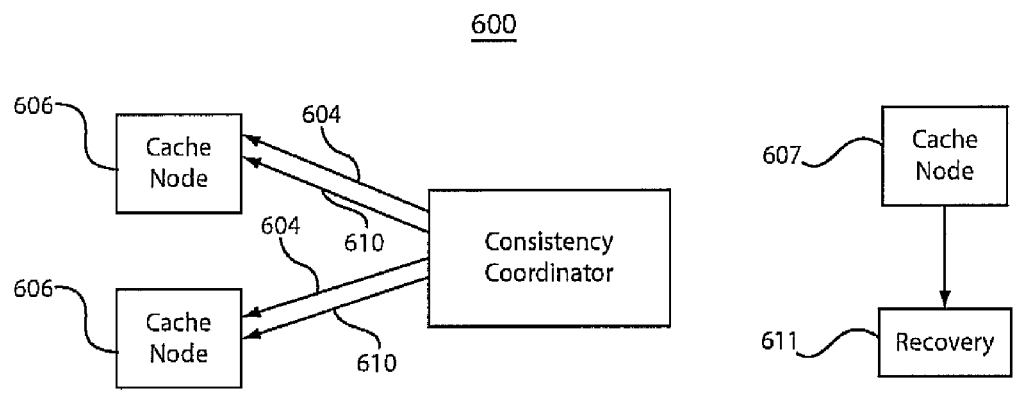
FIGS. 8A and 8B show illustrative systems (with and without a consistency coordinator, respectively) using heart beat messages in accordance with the present invention.
Figure 8B:
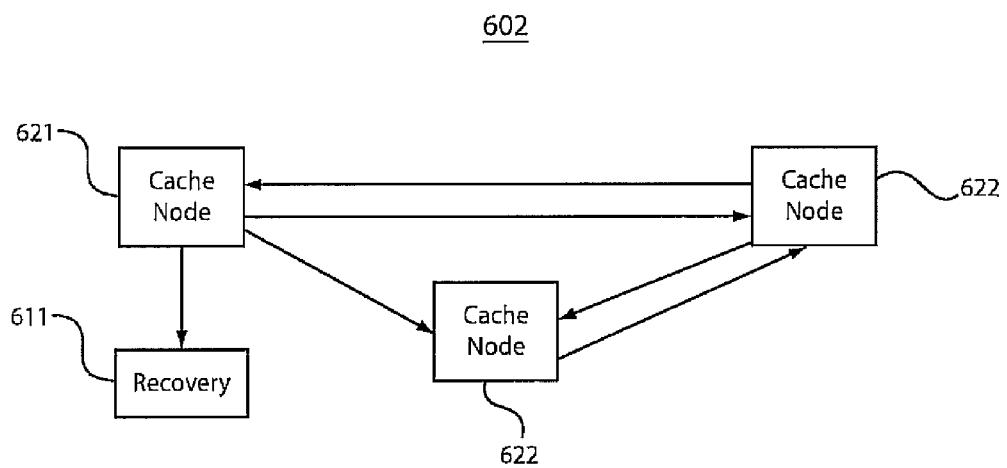

Referring to FIGS. 8A and 8B, to ensure consistency across node and network failures, deferred invalidation notifications may be combined with heartbeat messages. For a system 600 with centralized cache consistency (FIG. 8A), a consistency coordinator 602 sends, periodically, heartbeat messages 604 to all nodes 606 in the system. If a cache node 606 does not receive a heartbeat message at the expected time interval, it considers itself down and stops serving requests. The "down" cache node 607 initiates a recovery procedure 611. When the invalidation time is set far enough in the future to include a heartbeat interval, caches that do not receive the deferred-invalidation message 610 are likely to have considered themselves down by the time of the invalidation time.

For a system with distributed cache consistency (FIG. 8B), each node 622 sends periodically heartbeat messages 604 to all of the nodes in the system. If a node (621) fails to receive all of the expected heartbeat messages, it considers itself down, stops serving requests, and initiates a recovery procedure 611.

The deferred-invalidation consistency addresses a drawback of traditional consistency methods. For these methods the current version of an updated object is invalidated as soon as the invalidation message is received at a cache node. The coordinator will start serving the new version as soon as for each cache, the acknowledgment is received or it is declared down. One issue of these methods is that the caches may respond with very different rates, some relatively fast while others relatively slow. As a result, the updated object is not accessible at faster responding caches for relatively long time periods. During this period, pending requests from clients are queued; thus, the response latency may be unpredictably high. Deferred-invalidation consistency addresses this drawback by allowing the caches to serve the old version of the update object until the system can guarantee that all of the active caches are ready to serve the new version of the object. Therefore, requests arrived at active caches will never be blocked because other caches in the system fail to respond to the update procedure. The drawback is that updated content is available with a longer delay than for Coordinate methods when all caches are active and fast responding.

Cache Consistency Infrastructure

The cache consistency infrastructure integrates the present invention.

The system of the present invention includes at least one consistency coordinator 12 associated with the content provider server(s) 11 and several consistency slaves, corresponding to remote caches 13, which store copies of objects produced by content providers and may update them as a result of client requests. The Consistency Slaves may be co-located with the corresponding caches and implement the cache counterpart of the consistency protocols.

The architecture of the present invention includes one or more consistency coordinators. Multiple consistency coordinators permit higher throughputs and higher availability. If one consistency coordinator fails, a back-up consistency coordinator can take over for the failed one. The functions performed by the coordinator may include at least the following:

1. Maintain information about which caches are storing which objects
2. Access and keep track of attributes of objects specified by the content provider. In particular, the coordinator should get the consistency policy to be used for an object.
3. Coordinate updates, through invalidation, to the caches upon request from content providers.

Additionally, the coordinator can function as a reverse proxy cache for the content provider, serving requests for objects invalidated through consistency protocols, and obviating the need for the content provider to handle these requests.

The coordinator handles several types of requests, which may include the following:

GET requests, which are used by caches to retrieve objects of interest.

IF-MOD-SINCE requests are used to check whether an object was updated since a particular moment in the past, and if so, to retrieve the new version of the object.

UPDATE requests, which are used by content providers/writers to notify that a new version of an object is available.

LOCK requests, which are used by content providers/writers to notify their intent to initiate an object update.

In the process of serving GET and IF-MOD-SINCE requests the coordinator may retrieve the requested object from the content provider, possibly saving it in a local cache, and returning it to the requesting cache. Alternatively, the coordinator may reply to the cache with a REDIRECT message, indicating the node (cache or content provider) to which the cache should send its request.

Both GET and IF-MOD-SINCE requests may be delayed when the coordinator is in the process of updating the object. The coordinator can implement a policy of choice for handling requests received while the related object is being updated. For example, the reply can be postponed until all invalidations are complete, or an error message can be sent immediately indicating the page is not available.

An UPDATE request triggers the coordinator to begin the consistency procedure. Based on the consistency policy of the object, the coordinator sends invalidation messages to caches and waits for acknowledgments from caches. For objects with multiple writers/content providers, a writer may issue a LOCK request prior to initiating the update procedure. Depending on the type of consistency of the object, the writer may update its object-related information to indicate that object is in process of being updated by the writer. Also, the coordinator may delay the reply until the UPDATE requests from writers previously locking the object have been completed.

In the event of a failure, the coordinator may lose part or all of its object and cache-related information. The coordinator can use a number of techniques for reacquiring information lost in the event of a failure. For example, the coordinator may acquire, either immediately or over time, information of which caches include which objects. One way to do this is to demand immediately that all caches either clear their caches or send to the coordinator the list of the currently cached objects with holder-only invalidations policies. Alternatively, the information can be built up over time by invalidating caches for objects, which have not been updated since the coordinator has restarted.

The coordinator may be designed so that it can use a variety of different protocols and mechanisms for communicating with caches and servers. The coordinator can also be adapted to perform functions not necessarily related to consistency management, such as collecting statistical information from the caches and monitoring availability/responsiveness of the caches. If multiple coordinators are being used, the coordinators can be configured so that different coordinators manage different subsets of the object space; possibly with the directory hash partitioned among these components. This can provide high scalability and availability.

Cache Consistency Methods

Besides the deferred invalidation consistency method, the consistency coordinator may integrate other methods for weak and strong consistency. For instance, it may integrate weak consistency methods such as expiration-time consistency, update-all consistency, update-holders consistency, update-local-copy consistency, and update-global-copy consistency. Also, the coordinator may integrate strong consistency methods such as coordinate-all consistency, coordinate-holders consistency, multiple-writers consistency.

Weak Consistency

For weak consistency paths, expiration-time consistency will now be addressed. Expiration-time consistency is a method used for Web caches, which communicate with content providers via HTTP. The content provider assigns to each object an expiration time. Consistency is managed by caches obeying expiration times. Namely, if an object is requested after its expiration time, a cache contacts the content provider to obtain the latest version of the object or, if the object has not changed, the new expiration time.

Update-all consistency addresses the problem of single-writer updates. With this method, consistency is managed by sending consistency messages to caches whenever an object changes. The type of consistency message depends on the implementation and object characteristics. Generally, the message instructs a cache to invalidate any local version of the identified object it may have.

Caches send an acknowledgment that they have received and successfully processed the invalidation message. If they fail to respond within a timeout period, the message is resent. If a cache fails to respond after several retries, special action is taken.

Update-holders consistency addresses the problem of single-writer updates. This method is similar to update-all consistency except that consistency messages are only sent to caches that are storing the object. The consistency coordinator maintains information that indicates which caches are storing which objects. This information is used when an object update occurs to create the list of caches to which invalidation messages are to be sent. To enable this ability, the consistency coordinator may act as a reverse proxy between the content provider and the caches.

When an object needs to be updated, the coordinator determines which caches include the object and sends consistency messages only to those caches. In order to maintain an accurate list of which caches include which objects the coordinator updates its state when the following types of operations occur:

1. when a cache miss is served. The cache sends a GET request to the consistency coordinator, which will update its state appropriately.
2. when a cache discards an object. The cache notifies the consistency coordinator that the object is no longer in the cache.
3. when an object is updated. The coordinator manages the sending of invalidation messages and updates its state appropriately.

The consistency coordinator may be a single entity or may run across multiple applications and/or nodes. If a consistency coordinator is running on multiple nodes, one method for achieving high availability and high throughputs is for each consistency coordinator node to maintain information about different sets of objects. Based on the name of the object, the consistency coordinator node corresponding to the object could be determined. There are several methods for assigning objects to consistency coordinator nodes including hashing based on the object name.

Assigning objects to consistency coordinator nodes should be done in a manner, which distributes load evenly across the consistency coordinator nodes. If one node of a consistency coordinator fails, then the system only loses information about where objects are stored for the objects corresponding to the failed node, not all of the objects. It is also possible to have redundancy in how objects are assigned to consistency coordinator nodes. That way, the caches storing an object could be determined from more than one consistency coordinator. This adds additional fault tolerance since even less information may be lost in the event of a cache failure.

Update-Local-Copy consistency addresses the problem of multiple-writer updates. With this method, a writer accesses its local copy, performs the updates, and sends the new content to the consistency coordinator. The coordinator pushes the content to other caches using either update-all or update-readers consistency methods. Optionally, the coordinator sends an acknowledgement of the update to the writer. If the updated content arrives while the coordinator is in the process of pushing another update for the same object, it will save the newly arrived content until the current update procedure is completed. If another version of the object is already waiting for update, this version is discarded and the newly received version is saved.

Update-Global-Copy consistency addresses the problem of multiple-writer updates. Different than Update-Local-Copy, in this method, the writer updates the most recent version existing in the system.

Towards this end, before the update, the writer contacts the consistency coordinator to retrieve the most recent version of the object. The consistency coordinator sends the content, or acknowledges that the local copy in the write cache is the most recent. Upon sending the reply, the coordinator records a write lock for the object held by the writer and assigns it a lock timeout.

Upon receiving the most recent version of the object, the writer performs the update and sends the new version to the consistency coordinator, which cancels the write lock, and distributes the new content to the other caches using either update-all or update-readers consistency methods. Optionally, the coordinator sends an acknowledgement of update to the writer cache.

If the consistency coordinator receives another request for update before the current write lock for the object either is released or expires, it postpones the reply until the update is received or the write lock expires. In the former case, the new version is sent to the coordinator, and a new write lock is set for the object. In the latter case, the writer cache is sent a negative acknowledgment of update, and the coordinator sends the available version of the object to the coordinator, and a new lock is set for the object. Upon receiving a negative acknowledgement, the cache invalidates the updated version, if already created, and may reinitiate the update procedure. If an update completes before the previous version was fully distributed to caches (according to the chosen protocol), the coordinator saves the new content and acts as indicated for update-local-copy if the second update completes before the distribution completes. Read requests which arrive at the coordinator for an object with a write lock are responded to with the most recent version available on the coordinator.

The expiration-time consistency method is limited by the ability of the content provider to provide a good estimate for when an object is to expire. In many circumstances, this is not possible, and an object is updated before its expiration time. If only HTTP is used to communicate between content provider and caches, when the update occurs, the content provider has no way of initiating object invalidation or expiration-time change, thus the cache continues to serve the obsolete version.

Update-all and Update-holders consistency methods do not exhibit this limitation. By sending messages that invalidate an updated object or that simply change its expiration time to the time of the actual update, these methods can provide better consistency than expiration-time consistency. Comparing Update-holders and Update-all methods, the former method needs fewer consistency messages if many of the updated objects are not present in all caches. This benefit is more relevant when the update rate is relatively high.

However, Update-holders has the disadvantage that the consistency coordinator has to be notified of any cache update. If caches are modified frequently, the coordinator could become a bottleneck. A more scalable solution is to have the caches batch discard notifications, instead of sending them as they occur; this approach diminishes the difference in consistency messages between Update-holders and Update-all methods.

Strong Consistency Methods

Coordinate-all consistency addresses the problem of single-writer updates. The method is based on the idea that upon an update, caches invalidate their copy of the updated object before any of the caches can serve the new version of the object. More specifically, upon an object update, before making the new version available, the consistency coordinator sends invalidation messages to remote caches. A cache invalidates its copy of the object, if available, and acknowledges the invalidation request.

The consistency coordinator waits to receive acknowledgments from all caches. If a cache fails to respond within a timeout period, the invalidation message is resent, up to a preset limit on the number or duration of retries. If this limit is reached, the cache is declared inaccessible and an implementation specific mechanism ensures that if active, the cache, stops serving objects.

Once caches have acknowledged the notification or have been declared inaccessible, the consistency coordinator allows access to the new version of the object. Requests for the updated object that arrive at a cache after the invalidation message has been processed are handled in the way of a traditional cache miss, meaning that the cache sends a request to the coordinator for the first request and waits for a reply, queuing subsequent requests behind the first one. The coordinator reply depends on the stage of the consistency procedure.

Coordinate-holders consistency addresses the problem of single-writer updates. The method is based on the idea that an object update procedure like the one defined for Coordinate-all consistency should only involve those caches that will access the object without validation. Coordinate-holders consistency is similar to update-holders in that the consistency coordinator maintains information that indicates which caches are storing which objects. When the writer/content provider wishes to update an object it contacts the consistency coordinator. The coordinator notifies caches currently storing the object to invalidate their copy of the object. When these caches have acknowledged the request, the coordinator makes the new version of the object available.

If a cache fails to acknowledge the invalidation message the coordinator retries the request until it receives a response, up to a preset limit on the number or duration of retries. If this limit is reached, the cache is declared inaccessible and an implementation specific mechanism ensures that if active, the cache stops serving objects.

Figure 2:
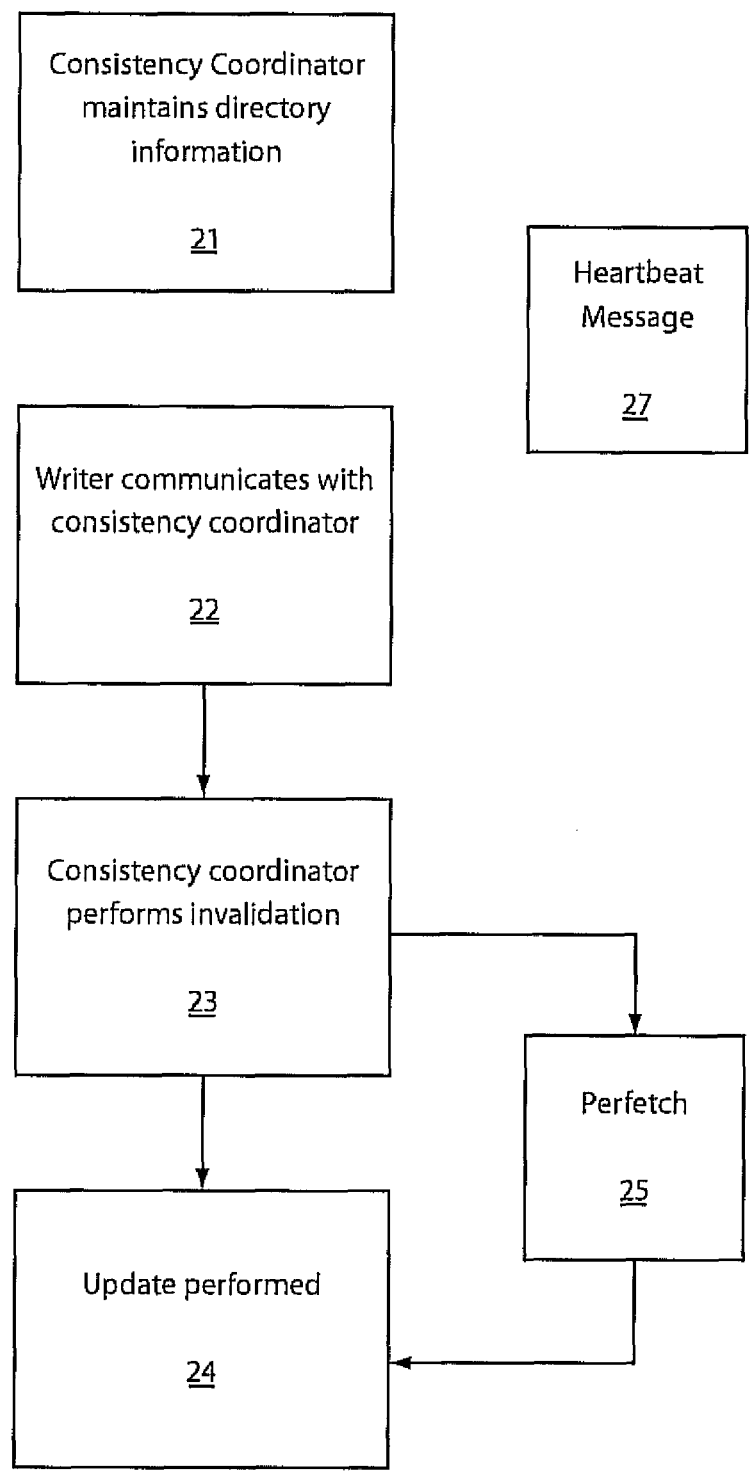
FIG. 2 is a block/flow diagram showing a method for maintaining consistency between copies in accordance with the present invention.

Referring to FIG. 2 with continued reference to FIG. 1, a method for achieving strong consistency in accordance with the present invention is depicted. Block 21 is constantly active as the system executes. The consistency coordinator 12 maintains information about which objects are being stored in which caches. In block 22, a writer 14 initiates a request to update an object. It contacts the consistency coordinator 12.

In block 23, the consistency coordinator 12 determines which caches, if any, are storing the object and for each cache including a copy of the object, the consistency coordinator 12 instructs the cache to delete its copy. After it receives acknowledgements that the deletions have completed, the consistency coordinator 12 informs the writer 14 that it can proceed with the update. If the object is frequently requested, in block 25, it may be desirable to prefetch the object into one or more caches after the update has completed. This step is optional.

There are a number of variations and options for the coordinate-holders method. A method for coordinating updates to an object when there are multiple writers is described below. This method can be used in conjunction with the coordinate-holders consistency scheme.

Also described herein is how cache failures can be handled using heartbeats.

Multiple-writers Strong consistency addresses the problem of multiple-writer updates in the context of enforcing strong consistency among the caches storing the object. In this method, before the update, the writer contacts the consistency coordinator to retrieve the most recent version of the object. The consistency coordinator sends the content, or acknowledges that the local copy in the writer cache is the most recent. Upon sending the reply, the coordinator records a write lock for the object held by the writer and assigns it a lock timeout.

Upon receiving the most recent version of the object, the writer performs the update and sends the new version to the consistency coordinator, which cancels the write lock, and distributes the new content to the other caches using either coordinate-all or coordinate-holders consistency methods. To the writer cache, the coordinator sends an acknowledgement of update upon receiving all of the acknowledgements to the related invalidation requests. The writer is not using the new version of the object to reply to client requests until it receives an acknowledgement from the coordinator. In the meantime, it can use the previous version of the object to reply to requests that only require a read of the updated object. If the writer receives an invalidation request before the acknowledgment, it discards both the old and the updated versions of the object.

If the consistency coordinator receives another request for update before the current write lock for the object expires, it postpones the reply until the update is received or the write lock expires. In the former case, the new version is sent to the requesting node and a new write lock is set for the object. In the latter case, the writer cache is sent a negative acknowledgment of update, and the requesting node is sent the version of the object available to the coordinator and a new lock is set for the object. Upon receiving a negative acknowledgement, the cache invalidates the updated version, if already created, and it can reinitiate the update procedure.

If an update completes before the previous version was fully distributed to caches (according to the chosen protocol), the coordinator saves the new content and acts as indicated for update-local-copy if the second update completes before the distribution completes.

Read requests arrived at the coordinator for an object with a write lock are responded with the most recent version available on the coordinator.

An issue with the Coordinate-all method is that on each update, the consistency coordinator contacts each cache in the configuration, whether or not the cache has a copy of the updated object. This can result in unnecessary network traffic if objects tend to be stored only in small subsets of the caches.

The Coordinate-holders consistency addresses this issue of the Coordinate-all consistency because only the caches that have stored the object are involved in the consistency enforcement protocol. Deferred-invalidation consistency can be applied to coordinate all caches or only the holders of the updated object.

For Multiple-writers Strong consistency, the worst-case time of write completion includes a multiple of the write lock timeout and an invalidation timeout.

Object Meta-information and State

An object usually has a consistency policy assigned to it. For strong consistency policies, an object has two states, Serving and Updating. The Serving state indicates that the object is consistent in all caches and can be served by the coordinator. The Updating state indicates that an update request for the object is in process, and any request received for the object at the coordinator should be queued until the update is completed or replied to with an error message. This state begins when an update request is received from the content provider, and ends when all invalidation acknowledgements have been received (or retried until timeout) and the new version of the object can be made available.

For weak consistency policies, an object usually has only one state, Serving, which indicates that it can be served by the coordinator.

A cache can be in one of three states:

Available, which indicates that consistency-related communication initiated by the coordinator with the cache was completed correctly;

Retry, which indicates that the cache has not responded to the most recent message sent by the coordinator;

Down, which indicates that the cache is considered failed.

The coordinator views a cache as Available, as long as the cache is responding within a timeout period to the messages sent by the coordinator. If the coordinator experiences an error communicating with a cache, it changes the state of the cache to Retry and continues to retry the failed communication. If the communication succeeds within an implementation-specific interval, the state of the cache returns to Available. On the other hand, if the communication fails, the cache is considered Down and no further communication is sent to it until the cache sends a "BackToLife" message, indicating that it would like to recover its status since contact was lost. On receipt of that request, the coordinator and cache perform the consistency recovery protocol.

To bound the latency of completing a strong consistency protocol and the likelihood of inconsistency for weak consistency protocols, the coordinator sends to caches periodic heartbeat messages. Given the constant stream of requests from the caches, the heartbeats need not be in the form of separate messages; the presence of normal message traffic could take its place except during idle periods.

When a cache state is Available, heartbeat messages are sent every heartbeat interval. In Retry state, a cache is not sent heartbeats, but the coordinator is actively retrying the failing communication for as long as a heartbeat interval. If the message retry is successful, normal heartbeat messages resume and no further action is required. If the heartbeat interval passes without an acknowledgment from the cache then the coordinator changes the state of the cache to Down. When the coordinator changes the state to Down, the cache, if alive, declares itself Down as well, because it has not received any heartbeat message for the last heartbeat interval (because the server did not send any). In this state, the cache is not serving any object with coordinate-type or update-type consistency policy, but it can serve objects with expiration-based consistency.

One aspect can be derived from noticing that the need to allow completion of the barrier synchronization during updates of strongly-consistent objects is different from the need to keep caches from serving excessively stale weakly-consistent objects. These two needs may best be served by significantly different timeouts for the cache to use for passing from the Available state to the Down state with regard to strongly-consistent versus weakly-consistent objects. For example, it may be felt that service of updates for strongly-consistent objects should never be delayed by more than 15 seconds, while it may be perfectly acceptable to allow service of weakly-consistent objects to continue for up to 2 minutes after the update has taken place. Having separate timeout intervals for these 2 types of objects would allow the lapse of service during update of a strongly-consistent object to be kept to a reasonable minimum while, at the same time, avoiding lapses in service of weakly-consistent data due to unnecessarily stringent timing demands on the caches' network connections to the coordinator.

There are several types of requests or commands that are received and sent by the coordinator in accordance with the present invention. The coordinator's response depends on the status of the cache and the status of the object. The coordinator may also update its own status based on receipt of the request. As a general procedure, when the coordinator receives a command from a Down cache, other than a request to recover, the coordinator returns an error message that notifies the cache that it should be Down. This causes the cache to perform recovery before it serves more objects. This situation occurs when the coordinator believes the cache has gone down but the cache does not believe it is down.

GET Request

The coordinator receives GET requests from a cache when it is asked to serve an object, which it is not in its cache, for example, a cache miss. The coordinator retrieves the requested object from the content provider (or from a local cache if appropriate) and returns it to the cache. When the object being requested has consistency policy with holder-only invalidations, a GET request indicates that the cache issuing the request now has this object in its cache and should be included in update processing. The coordinator updates its information to make note of this status change.

If the object is in state Updating (e.g., in the process of being updated with one of the coordinate-type policies), the GET request is queued until the update is complete or replied with an error message.

IF-MODIFIED-SINCE Request

The coordinator receives IF-MODIFIED-SINCE requests when the cache includes an object, but may not contain the most recent version of the object. The coordinator processes the request as appropriate, returning a new version of the object if appropriate. When the object being requested has consistency policy with holder-only invalidations, the coordinator updates its information appropriately.

If the object is in state Updating (e.g., in the process of being updated with one of the coordinate-type policies), the request is queued until the update is complete or replied to with an error message.

DISCARD Request

The coordinator receives DISCARD requests when a cache chooses to discard an object that has a policy with holder-only invalidations. Upon receiving a DISCARD request, the coordinator updates its information to reflect that the cache is no longer storing the object.

UPDATE Request

The coordinator receives an UPDATE request from a content provider or writer that notifies the coordinator that a new version of an object is available. The procedure executed upon receiving this command depends on the type of consistency of the updated object.

Weak Consistency Policies: Update-all, Update-holders, Update-local-copy

Upon receiving an update for an object with a weak consistency policy, the coordinator refreshes the version of the object, updating the meta-data information, and possibly retrieving the new version of the object in the local cache. The coordinator sends invalidate messages to either all its associated caches, in the case of update-all, or all caches known or suspected to have the object, in the case of update-holders. The coordinator waits for acknowledgments from the caches for the invalidate command, and retries if necessary. If a cache fails to respond after retrying for the heartbeat interval, the coordinator declares that cache Down and stops communication with it until that cache has performed recovery.

Weak Consistency Policies: Update-Global Copy

Upon receiving an update for an object with update-global copy consistency, the coordinator checks whether the node is the current holder of the object lock. If this is true, the indication that the node is the lock holder is removed, and an update procedure described herein is performed, and, eventually, the first node waiting in the object's lock queue is granted the lock (e.g., sent a reply to its LOCK request). If the requesting node is not the lock holder, the update request is denied and the node is sent an error message.

Strong Consistency Policies: Coordinate-all, Coordinate-holders

Upon receiving an update for an object with a strong consistency policy, the coordinator updates the status of the object to Updating. This ensures that future requests for the object are queued. Then, the coordinator sends invalidate messages to either all its associated caches, in the case of coordinate-all, or all caches known or suspected to have the object, in the case of coordinate-holders. The coordinator waits for acknowledgments from caches for the invalidate command, and retries if needed. If a cache fails to respond after retrying for the heartbeat interval, the coordinator declares that cache Down and stops communication with it until that cache performs the recovery procedure. Once caches have acknowledged the invalidate command or have been declared Down, the coordinator makes the new version of the object available and updates the object state to Available.

Deferred-Invalidation Policy

Upon receiving an update for an object with deferred-invalidation consistency policy, the coordinator determines the invalidation time and registers it in the object descriptor. For multiple-writer objects, the coordinator checks whether the node is the current holder of the object lock. If this is true, the indication that the node is the lock holder is removed, an update procedure is performed, and, eventually, the first node waiting in the object's lock queue is granted the lock (e.g., sent a reply to its LOCK request). If the requesting node is not the lock holder, the update request is denied and the node is sent an error message.

The coordinator sends deferred-invalidation messages to either all or the holder cache, depending on the configuration. The coordinator waits for acknowledgments from the caches for the invalidate command, and retries if needed. If a cache fails to respond after retrying for the heartbeat interval, the coordinator declares that cache Down and stops communication with it until that cache performs the recovery procedure. Requests that arrive at the coordinator prior to the invalidation time are served with the old version of the object. The first request received after the invalidation time triggers the actual update, by discarding the old version and retrieving the new version from the content provider or from the local repository.

Strong Consistency Policies: Multiple-writers Strong

Upon receiving an update for an object with update-global copy consistency, the coordinator checks whether the node is the current holder of the object lock. If this is true, the indication that the node is the lock holder is removed, an update procedure is performed, and, eventually, the first node waiting in the object's lock queue is granted the lock (e.g., sent a reply to its LOCK request). If the requesting node is not the lock holder, the update request is denied and the node is sent an error message.

LOCK Request

The coordinator receives a LOCK request when a content provider or writer decides to initiate an update procedure for an object with multiple writers. Upon receiving the LOCK request, the coordinator checks whether the object is being locked by another node. If this is true, the requesting node is placed on the waiting queue of the lock. If this is false, the object is marked as being locked by the requesting node and the node is sent a reply indicating the availability of the object for update and the most recent version of the object. Optionally, the reply may include the content of the most recent version of the object.

CONSISTENCY-POLICY-CHANGE Request

The coordinator receives a CONSISTENCY-POLICY-CHANGE request when a content provider notifies the coordinator when the consistency policy for the object has changed. If a consistency policy change is received while an object is being updated, the currently active update is completed using the previous policy, and the new policy takes effect once the update is complete.

If the new policy is one, which does not need cache/object relationships to be maintained by the coordinator, then changing the policy of an object is relatively simple. Once active updates are complete the coordinator removes state information about the object. This applies to changing to policies: expiration-time, update-all and coordinate-all.

If the new policy is one which needs cache/object relationships to be maintained by the coordinator and the prior policy did not need these relationships, the list of caches including the object should be built if the prior policy was update-all or coordinate-all. In this case, the coordinator invalidates the object in caches. Invalidations are sent to all caches and the coordinator waits for acknowledgments. Once all caches acknowledge or are declared Down, the change is complete. During the period that the coordinator is waiting for acknowledgments no updates to the object are allowed, but GET requests are honored as if the new policy was in effect.

Recover or BackToLife Request

Once a cache detects that it may have lost communication with the coordinator, normally via a missing heartbeat, it sends a Recover, or BackToLife, message to the coordinator. When the cache state at the coordinator is Available, the coordinator response indicates that communication was not lost, meaning a heartbeat may have been lost but no updates happened during that time so that cache state is still valid. In this case no further processing is needed.

When the cache state is Down, the coordinator reply signals the cache to initialize the recovery procedure because the cache lost at least one invalidation message.

When the cache state is Retry, the coordinator reply indicates that retry is taking place. Also, the coordinator may extend the retry interval to ensure that the retry will continue for at least a configuration-specific constant. This helps minimize the likelihood of declaring the cache down just after its connectivity recovered, but it is a trade-off with the latency of a strong consistency update.

Heartbeat Notification

The coordinator sends heartbeat notifications to all caches in state Available, at fixed time intervals. The heartbeat interval is a system configuration parameter. The cache does not have to acknowledge heartbeat messages, but uses them to verify that the coordinator still considers it alive. It is also possible within the spirit and scope of the present invention to send heart beat messages from a cache to the consistency coordinator.

Invalidation Notification

The coordinator sends Invalidation notifications to one or more caches in state Available to indicate that particular objects should be discarded from their local stores. These messages are triggered by UPDATE requests. Depending on the type of consistency of the invalidated objects, caches may have to acknowledge the receipt of an Invalidation notification.

Consistency Slave

The consistency slave is a module loaded on the cache node. The functions of this module may include the following:

1. track of consistency state of the various objects in the local cache; and
2. interact with consistency coordinator.

The consistency slave configuration parameters include the address of consistency coordinator(s). In systems with multiple consistency coordinators, it is assumed that the mapping of objects to consistency coordinators is defined by configuration parameters.

Data structures for the consistency slave will now be described. The consistency slave maintains state for the objects with holder-only invalidations policies. The presence of an object ID on a list maintained by a consistency slave indicates that the cache has to send a discard request when the object is removed from the cache. The Consistency Slave maintains state for the objects currently locked by the cache applications. Also, the consistency slave maintains state regarding the connectivity of the local node to the rest of the system, in particular to the consistency coordinator. The per-object state of the consistency slave may be maintained separately or may be integrated with the state maintained by the cache application.

The cache application invokes the consistency slave when it needs to read or write an object, and when it discards an object from its local store.

Read Command

The Read command is invoked when the cache has to serve a read request. The call parameters provide the object identifier, and metadata information such as the existence of the object in the cache. If the object is registered with the consistency slave and the metadata indicates a consistency type that does not need consistency checks, the call returns with the indication that the cache application should handle the object itself. Otherwise, if the consistency slave knows the consistency type of the object, it executes the specific consistency protocol. If the consistency type is not known yet (e.g., when object is not in local cache), the slave interacts with the consistency coordinator to retrieve the object's characteristics and, optionally, the associated content. Eventually, the slave returns to the cache application with an indication of whether a local copy is valid or the cache should retrieve the object from an indicated location.

Read-for-Update Command

This command is invoked by the cache application when it has to initiate an update operation. The call parameters provide the object identifier, and metadata information such as the existence of the object in the cache. If the object is registered with the consistency slave and the metadata indicates a consistency type that does not need any consistency-related procedure, the call returns with the indication that the cache application should handle the object itself. Otherwise, if the consistency slave knows the consistency type of the object, it executes the specific consistency protocol. For instance, if the policy is Update-Global Copy, the slave interacts with the coordinator to acquire the lock on the object. If the consistency type is not known yet (e.g., when object is not in local cache), the slave interacts with the consistency coordinator to retrieve the object's characteristics and, optionally, the associated content. Eventually, the slave returns to the cache application with an indication of whether a local copy is valid or the cache should retrieve the object from an indicated location, and on whether the cache should create the new version of the object without overriding the current version.

Update-Completion Command

This command is invoked by the cache application when it completes an update operation. The call parameters provide the object identifier, indication of whether the update completes successfully or it was aborted, and the location of the new version (if successful update). Depending on the consistency type of the object, the consistency slave interacts with the coordinator to indicate the completion of the operation.

Discard Command

This command is invoked by the cache application when it discards an object from the local store. The consistency slave executes the protocol specific for the object type. No specific information is returned to the cache application.

The consistency slave learns about the type of consistency associated with an object from the metadata attached to the replies to its GET and LOCK requests to the consistency coordinator.

Object invalidations and acknowledgements, (deferred) removal notifications, and heartbeat messages may be delivered through messages on a persistent connection between the cache node and consistency coordinator node.

The interaction between the slave and the coordinator can be embedded in HTTP messages or they can be implemented by other protocols. In the former case, GET, IF MODIFIED SINCE, and LOCK requests can be sent with HTTP GET requests. UPDATE, CONSISTENCY-POLICY-CHANGE, and RECOVER requests can be sent with HTTP POST requests. Similarly, INVALIDATION and HEARTBEAT messages can be sent with HTTP POST requests. The messages initiated by the coordinator, such as HEARTBEAT and INVALIDATION messages, are received at a designated port of the cache node, which can be handled by the consistency slave module itself or by cache application. In the former case, the consistency slave interface includes a callback function, which is invoked by the cache application upon arrival of a message on the designed port.

Batch Removal Notifications

For objects with consistency policies that need updates to be sent only to the caches storing the object, the slaves send notifications of cache removal when objects are discarded from their caches. To reduce the overhead, these notifications can be batched in messages of up to MAX-MSG-SIZE bytes. These messages are sent when the maximum size is reached or a predefined time interval has elapsed since the first notification in the message was generated.

Due to batching or network delays, the coordinator can receive removal and get requests in reverse logical order, e.g., the GET following a removal GET arrive at the coordinator a priori to the removal notification. To ensure a correct accounting, the coordinator keeps track of the number of requests and removals received for a particular (object, cache)-pair for objects subject to policies with holder-only invalidations. On each request, the counter is incremented, and on each removal the counter is decremented. The server removes the cache from the holders list for the object when the counter gets to zero.

Aggregation of Consistency Protocol Messages

To reduce the overhead related to the transmission of consistency protocol messages, consistency coordinator or consistency slaves can aggregate several messages in one packet. For instance, Invalidation messages sent by the consistency coordinator can include the ID's of several objects. Similarly, the Acknowledgment message sent by a cache can include the ID's of several objects.

For further overhead reductions, the consistency infrastructure enables the specification of consistency groups. Toward this end, an object is identified by the content provider by its ID and the list of consistency groups it belongs to. Update requests for a consistency group should trigger the invalidation of all of the objects in the group.

In this way, it is not necessary to enumerate each object in the group explicitly. Data update propagation (see e.g., "A Scalable System for Consistently Caching Dynamic Web Data", Jim Challenger, Arun Iyengar, and Paul Dantzig. In *Proceedings of IEEE INFOCOM'99*, New York, N.Y., March 1999) may be used to specify group membership.

Prefetch/Push

Servers and/or content providers may have the ability to prefetch or push a new version of an object to a cache. For objects with deferred invalidation consistency, the prefetch may occur before the invalidation time of the previous version is reached.

The present invention provides that cache nodes are instructed to discard an old version of an object at a time in the future, called an invalidation time, when each cache is likely to have either learned about the update or has declared itself disconnected. The invalidation time is determined based on the available infrastructure mechanisms and configuration parameters. The deferred cache invalidation method can be used in a system with distributed cache coordination, which is a system in which caches interact directly, without the mediation of a consistency coordinator. Also, the method can be used in a system with centralized cache coordination, implemented by a consistency coordinator. Furthermore, the method can be used in a system in which writers of an object, if more than one, coordinate through a locking mechanism.

Having described preferred embodiments of a system and method for achieving deferred invalidation consistency (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. In a system having a plurality of storage elements, a method for updating stored objects in the plurality of storage elements, comprising the steps of:
   storing an object in a plurality of storage elements;
   in response to a request to update the object, determining an invalidation time indicating when a current value of the object will become obsolete;
   delaying updating the object until the invalidation time; and
   updating at least one copy of the object after the invalidation time.

2. The method as recited in claim 1, further comprising a step of serving an object by a storage element only if the invalidation time for the object has not passed.

3. The method as recited in claim 1, wherein the system includes a consistency coordinator and the method further comprises steps of:
   determining the invalidation time using the consistency coordinator; and
   communicating the invalidation time to the storage elements storing the object.

4. The method as recited in claim 1, further comprising a step of sending, from the consistency coordinator to a storage element and/or from a storage element to the consistency coordinator, heart beat messages to obtain availability information.

5. The method as recited in claim 4, further comprising declaring an entity expecting a heartbeat down in response to the entity failing to receive a heart beat.

6. The method as recited in claim 1, further comprising a step of sending an acknowledge message, by the storage elements, that the invalidation time has been received.

7. The method as recited in claim 1, further comprising a step of invalidating all objects that have a current time later than the invalidation time.

8. The method as recited in claim 1, further comprising a step of discarding and replacing a current version of an object with a pending-update version if the object has a current time later than the invalidation time.

9. The method as recited in claim 1, wherein the storage elements include at least one cache.

10. The method as recited in claim 1, wherein the invalidation time is selected so that each of the storage elements storing a copy of the object will receive a request to update or invalidate the object by the invalidation time.

11. The method as recited in claim 1, further comprising the step of updating or invalidating other copies of the object after the invalidation time.

12. A program storage device readable by machine, tangibly embodying a program of instructions executable by the machine to perform method steps for a method for updating stored objects in a plurality of storage elements, the method steps comprising:
   storing an object in a plurality of storage elements;
   in response to a request to update the object, determining an invalidation time indicating when a current value of the object will become obsolete;
   delaying updating the object until the invalidation time; and
   updating at least one copy of the object after the invalidation time.

13. A system for updating stored objects, comprising:
   at least one object;
   a plurality of storage elements for storing the at least one object; and
   a consistency coordinator which receives a request to update the at least one object and in response determines an invalidation indicating when a current value of the at least one object will become obsolete;
   the storage elements delaying updating the at least one object until the invalidation time; and
   at least one storage element updating a copy of the at least one object after the invalidation time has passed.

14. The system as recited in claim 13, wherein the storage elements serve an object only if the invalidation time for the object has not passed.

15. The system as recited in claim 13, wherein the consistency coordinator communicates the invalidation time only to the storage elements storing the object.

16. The system as recited in claim 13, further comprising heart beat messages sent to obtain availability information from the consistency coordinator to a storage element and/or from a storage element to the consistency coordinator.

17. The system as recited in claim 16, further comprising a down mode for which an entity expecting a heartbeat declares in response to the entity failing to receive a heart beat.

18. The system as recited in claim 13, further comprising an acknowledge message sent by the storage elements when the invalidation time has been received.

19. The system as recited in claim 13, further comprising a pending-update 1version list to which an object is added pending an update if the object has a current time later than the invalidation time.

20. The method as recited in claim 13, wherein the storage elements include at least one cache.

* * * * *